United States Patent

Ogawa et al.

[11] 4,190,323
[45] Feb. 26, 1980

[54] WIDE ANGLE ZOOM LENS WITH HIGH ZOOM RATIO

[75] Inventors: Ryota Ogawa, Kawagoe; Takayuki Itoh, Tokyo, both of Japan

[73] Assignee: Asahi Kogaku Kogyo Kabushiki Kaisha, Tokyo, Japan

[21] Appl. No.: 894,275

[22] Filed: Apr. 7, 1978

[30] Foreign Application Priority Data

May 13, 1977 [JP] Japan .................................. 52-55046

[51] Int. Cl.² ............................................. G02B 15/16
[52] U.S. Cl. .................................................. 350/184
[58] Field of Search ........................ 350/184, 186, 214

[56] References Cited
U.S. PATENT DOCUMENTS 4,142,779  3/1979  Ogawa .................. 350/184

FOREIGN PATENT DOCUMENTS 2557547  7/1976  Fed. Rep. of Germany ........... 350/184

*Primary Examiner*—Conrad J. Clark
*Attorney, Agent, or Firm*—Sughrue, Rothwell, Mion, Zinn and Macpeak

[57] ABSTRACT

A two lens group type of miniaturized zoom lens system having a minimum wide end viewing angle of 76° and a zoom ratio at least 2.3. The first or object side lens group includes at least two positive and two negative lenses with the image side lens being positive. The second or image side lens group includes at least two positive lenses facing the object. The variable aperture is mounted in front of the second lens group and the fixed aperture, which may be proportionally movable, is mounted behind the second lens group. The overall lens system satisfies the following conditions:

$$2.3 \leq Z \leq 3.0, \quad (I)$$

$$0.8 \leq \frac{|f_1|}{\sqrt{f_W f_T}} \leq 1.5, \quad (II)$$

$$0.46 \leq \frac{f_2}{f_T} \leq 0.64, \text{ and} \quad (III)$$

$$1.15 \leq \frac{r_I}{f_W} 2.3, \quad (IV)$$

wherein:
  Z is the zoom ratio ($Z = f_T/f_W$),
  $f_1$ is the focal length of the first lens groups,
  $f_2$ is the focal length of the second lens group,
  $f_W$ is the focal length in the wide angle position,
  $f_T$ is the focal length in the telescopic or narrow angle position, and
  $r_I$ is the radius of curvature of the lens surface facing the object of the positive lens nearest to the image in the first lens group.

4 Claims, 18 Drawing Figures

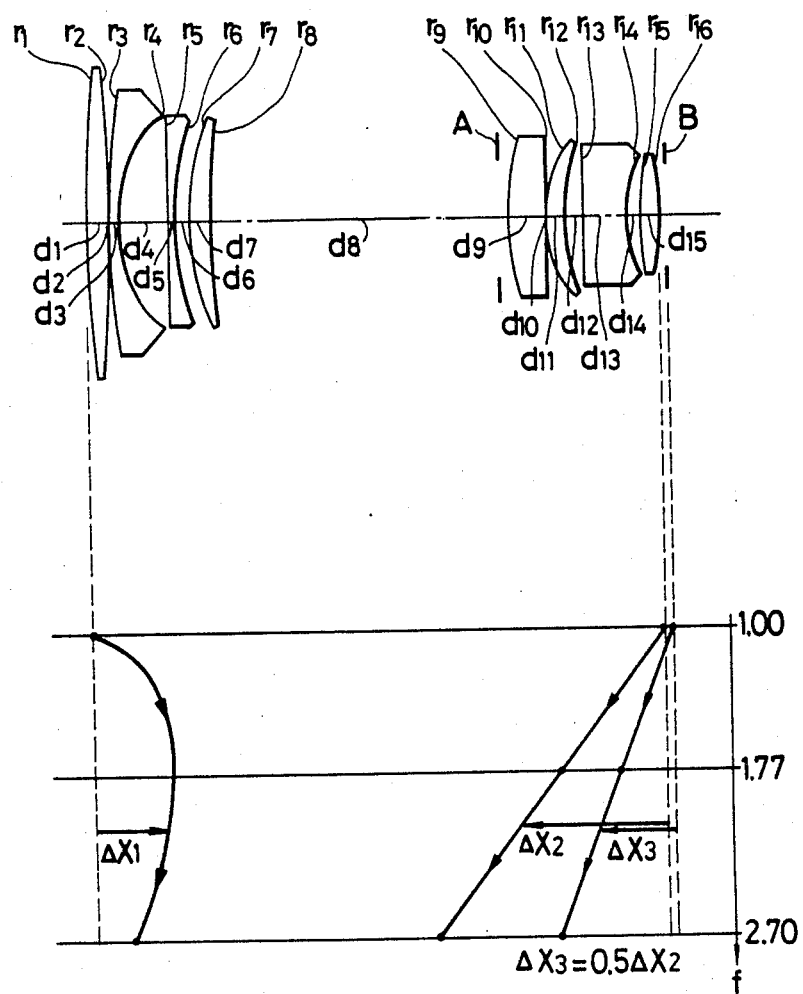

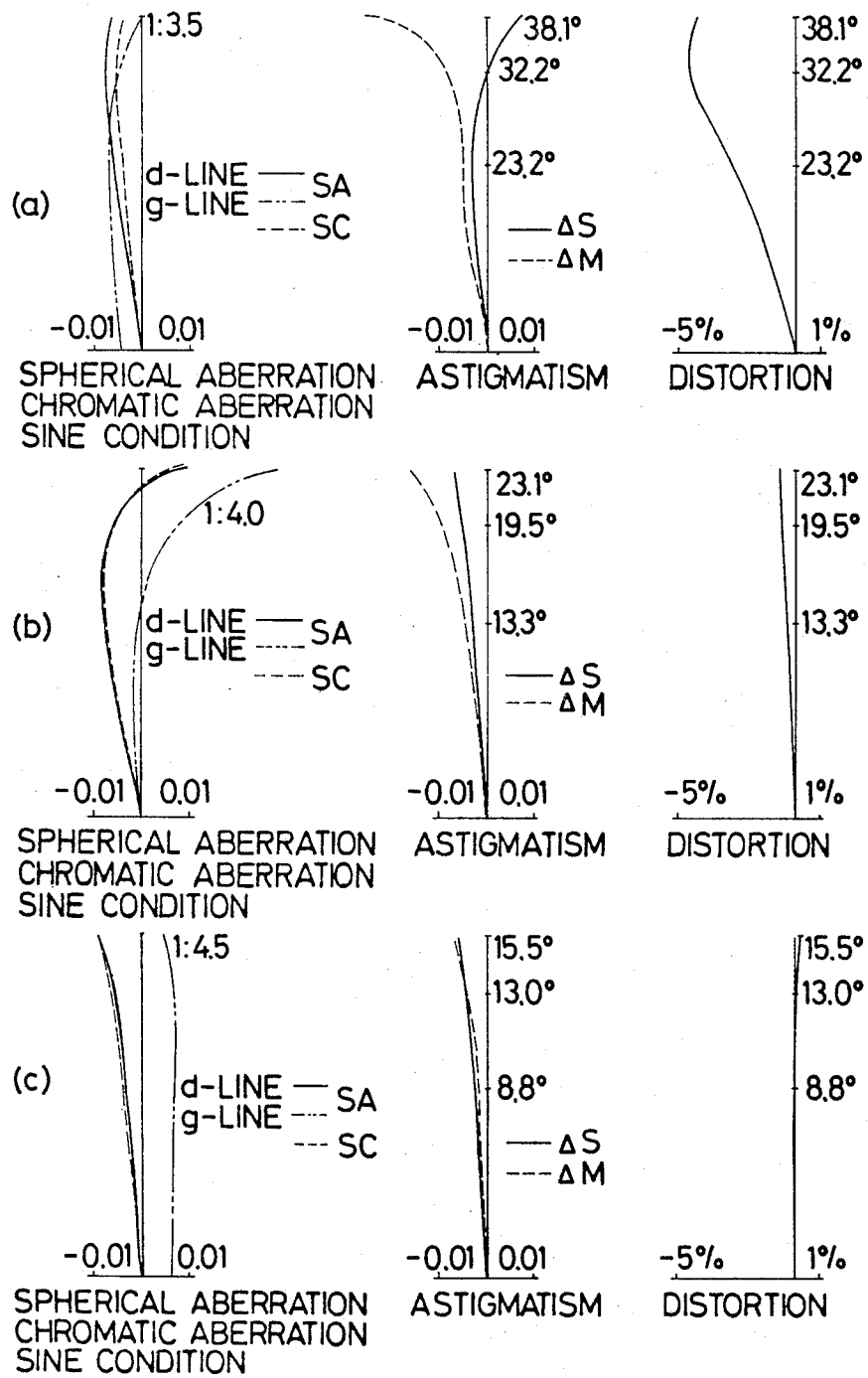

WIDE ANGLE ZOOM LENS WITH HIGH ZOOM RATIO

BACKGROUND OF THE INVENTION

This invention relates to a miniaturized zoom lens system having at least a 76° field of view at the wide end of the zoom range for general photography and a zoom ratio of 2.3 or more, and particularly to a two lens group type of zoom lens system wherein the first lens group has a divergent characteristic, the second lens group has a convergent characteristic, and the groups are mechanically moved to vary the focal length of the overall lens system while maintaining a constant image focus.

Such a two lens group type of zoom lens system has been advantageously used before to widen the viewing field angle, but the prior art system designs have not been successful in providing a high zoom ratio and an attendant wide focal length range.

SUMMARY OF THE INVENTION

The present invention provides a two lens group type of zoom lens system for photography wherein the lens power distribution obtained analyzing the movement characteristics of the two lens groups is utilized to miniaturize the overall length of the zoom lens system and at the same time provide a wide viewing angle range.

Before the details of the present invention are described, the movement characteristics of the two lens groups will be described referring to FIG. 1(a). The focal length of the first lens group is $f_1$ ($f_1 < 0$), the focal length of the second lens group is $f_2$ ($f_2 > 0$), and the distance therebetween is $l$. The relation to the overall focal length $f$ of the lens system is as follows:

$$\frac{1}{f} = \frac{1}{f_1} + \frac{1}{f_2} - \frac{l}{f_1 f_2}. \tag{1}$$

The back focal length $f_B$ is given by:

$$f_B = f_2 - \frac{f_2}{f_1} f. \tag{2}$$

The overall length $L$ is:

$$L = l + f_B = f_1 + 2f_2 - \frac{f_2}{f_1} f - \frac{f_1 f_2}{f}, \tag{3}$$

and therefore:

$$\frac{dL}{df} = -f_2 \left( \frac{1}{f_1} - \frac{f_1}{f_2} \right), \text{ and} \tag{4}$$

$$\frac{d^2L}{df^2} = -2f_1 f_2 \frac{1}{f^3}. \tag{5}$$

In equation (4), if $(dL/df) = 0$, then:

$$f = |f_1| = -f_1. \tag{6}$$

Similarly, in equation (5), if $f > 0$, then:

$$\frac{d^2L}{df^2} > 0. \tag{7}$$

Therefore, the overall length L is a minimum when $f = -f_1$, and if $f > 0$ a plot of the relation between L and f is downwardly convex as shown in FIG. 1(b). Accordingly, if the focal length f is defined in the range from $f_W$ (the focal length at the wide angle end) to $f_T$ (the focal length at the telescopic or narrow angle end), the maximum overall length of the lens system is small and well balanced when the overall length $L_W$ in the wide angle range is equal to the overall length $L_T$ in the telescopic angle range.

$$L_W = f_1 + 2f_2 - \frac{f_2}{f_1} f_W - \frac{f_1 f_2}{f_W} \tag{8}$$

$$L_T = f_1 + 2f_2 - \frac{f_2}{f_1} f_T - \frac{f_1 f_2}{f_T}.$$

If $L_W = L_T$, then:

$$f_1 = -\sqrt{f_W f_T}. \tag{9}$$

If $f_1$ of equation (9) is substituted into equation (8), $$L = -\sqrt{f_W f_T} + f_2 \left( \sqrt{\frac{f_T}{f_W}} + \sqrt{\frac{f_W}{f_T}} + 2 \right). \tag{10}$$

As mentioned above, the focal length $f_1$ of the first lens group should be established near the focal length obtained by equation (9), and the shorter the focal length of the second lens group the shorter the maximum overall length of the lens system.

BRIEF DESCRIPTION OF THE DRAWINGS

In the drawings:

FIG. 8 shows a lens construction corresponding to Example 4 below in the wide angle position and the zoom movement, and FIGS. 9(a) to 9(c) show the aberration conditions of Example 4.

DETAILED DESCRIPTION OF THE PREFERRED EMBODIMENTS

Figure 1A:
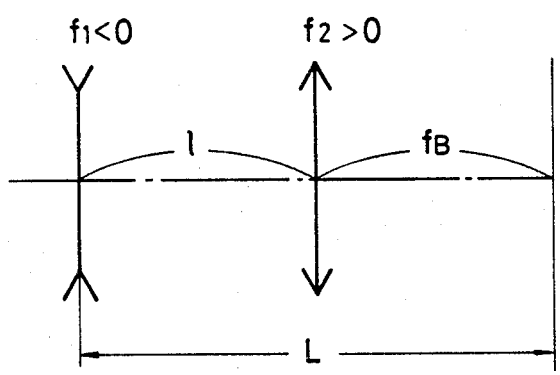
FIGS. 1(a) and 1(b) illustrate the lens group movement characteristics of a zoom lens system according to the present invention.
Figure 1B:
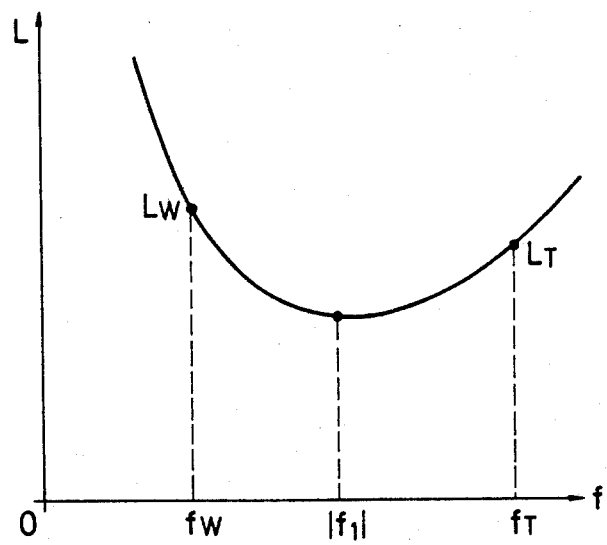
Figure 2:
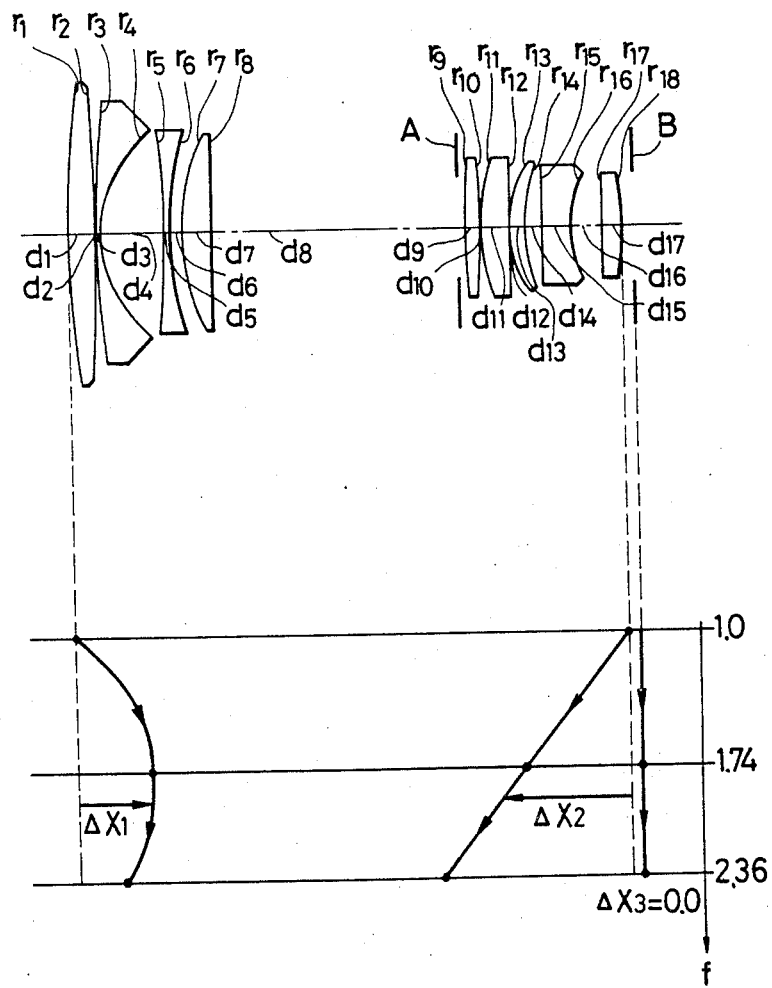
FIG. 2 shows a lens construction corresponding to Example 1 below in the wide angle zoom position and the zoom movement.
Figure 3:
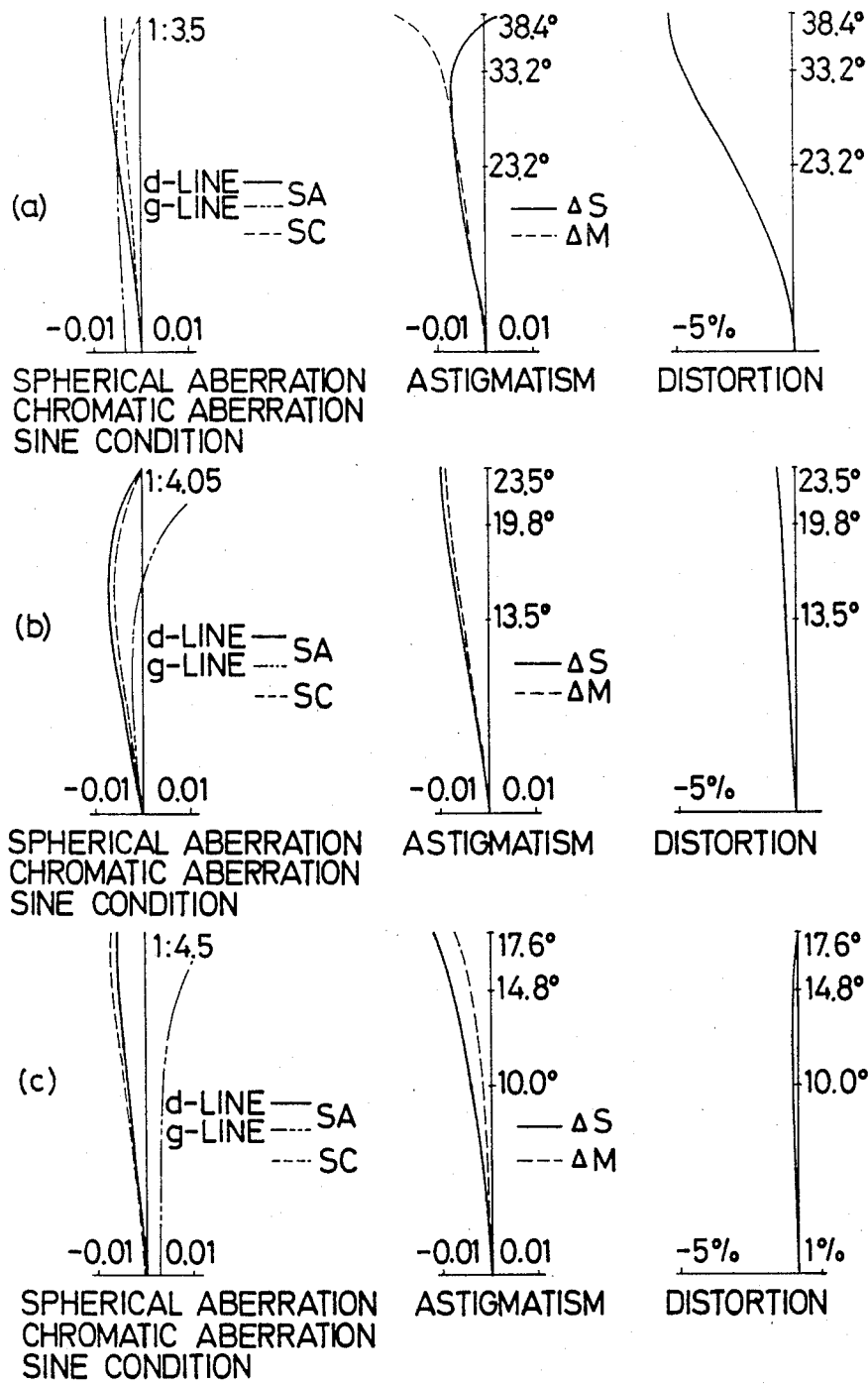
FIGS. 3(a) to 3(c) show the aberration conditions of Example 1, FIG. 3(a) being at the wide angle end, FIG. 3(b) being in the middle zoom range, and FIG. 3(c) being at the telescopic end.
Figure 4:
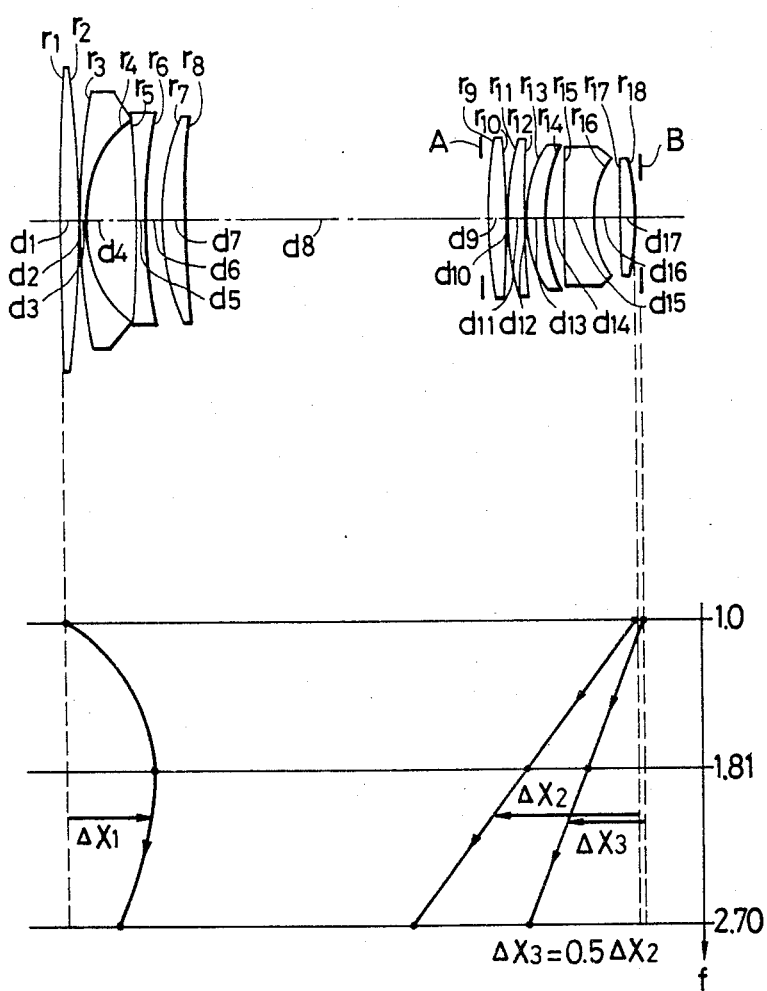
FIG. 4 shows a lens construction corresponding to Example 2 below in the wide angle position and the zoom movement.
Figure 5:
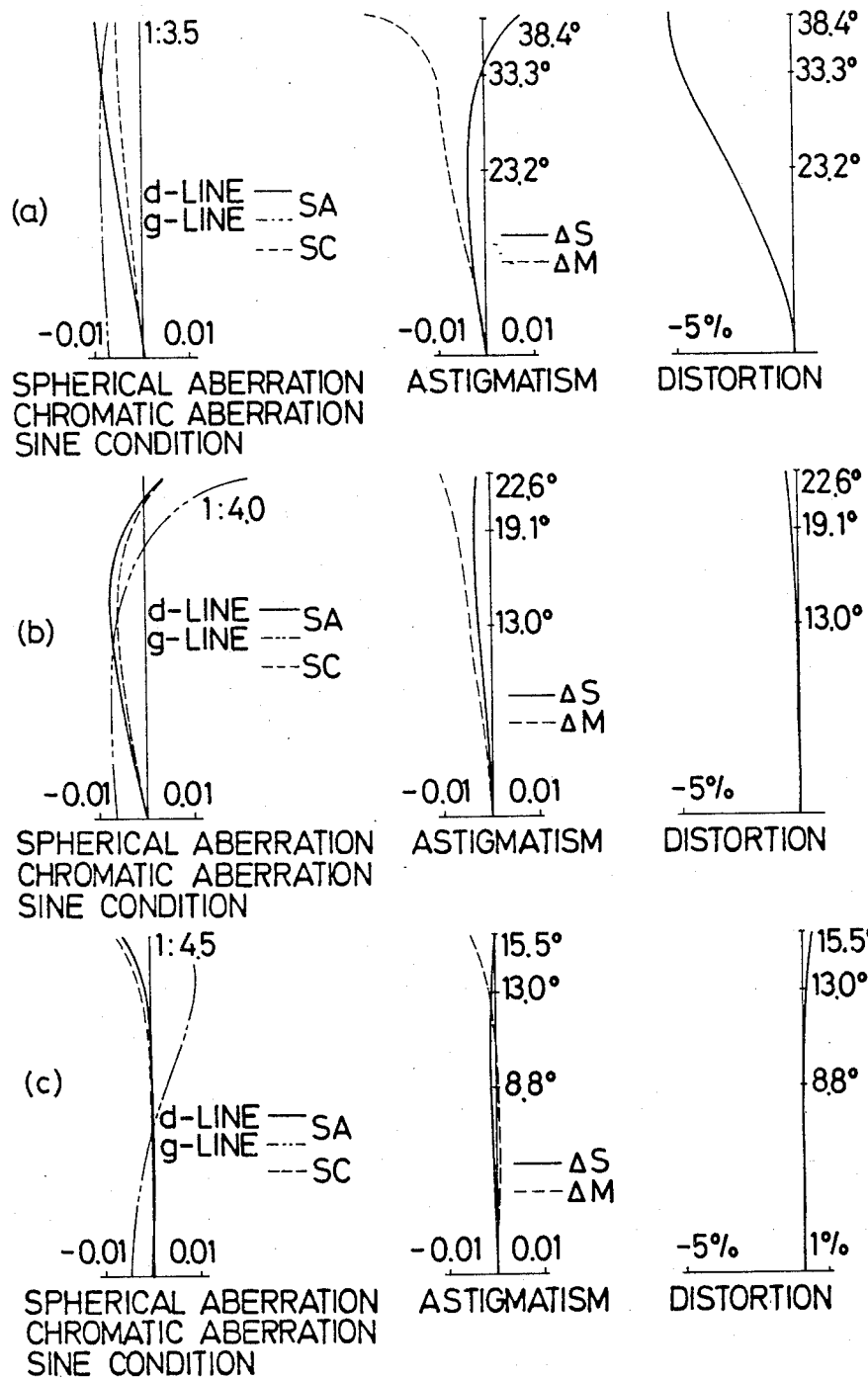
FIGS. 5(a) to 5(c) show the aberration conditions of Example 2.
Figure 6:
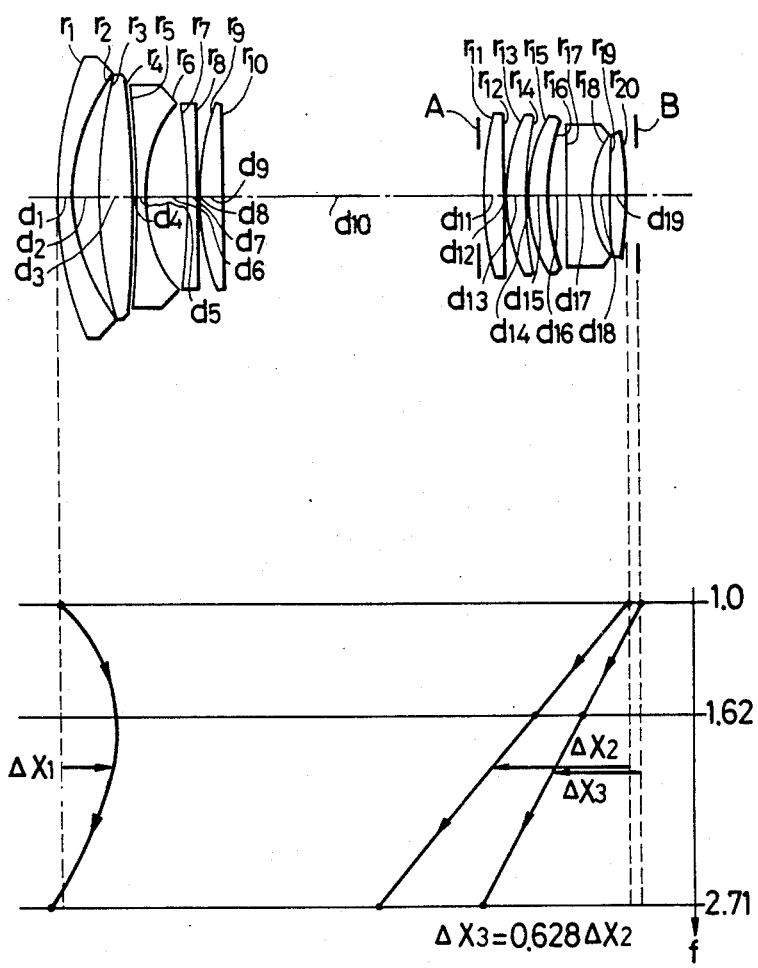
FIG. 6 shows a lens construction corresponding to Example 3 below in the wide angle position and the zoom movement.
Figure 7:
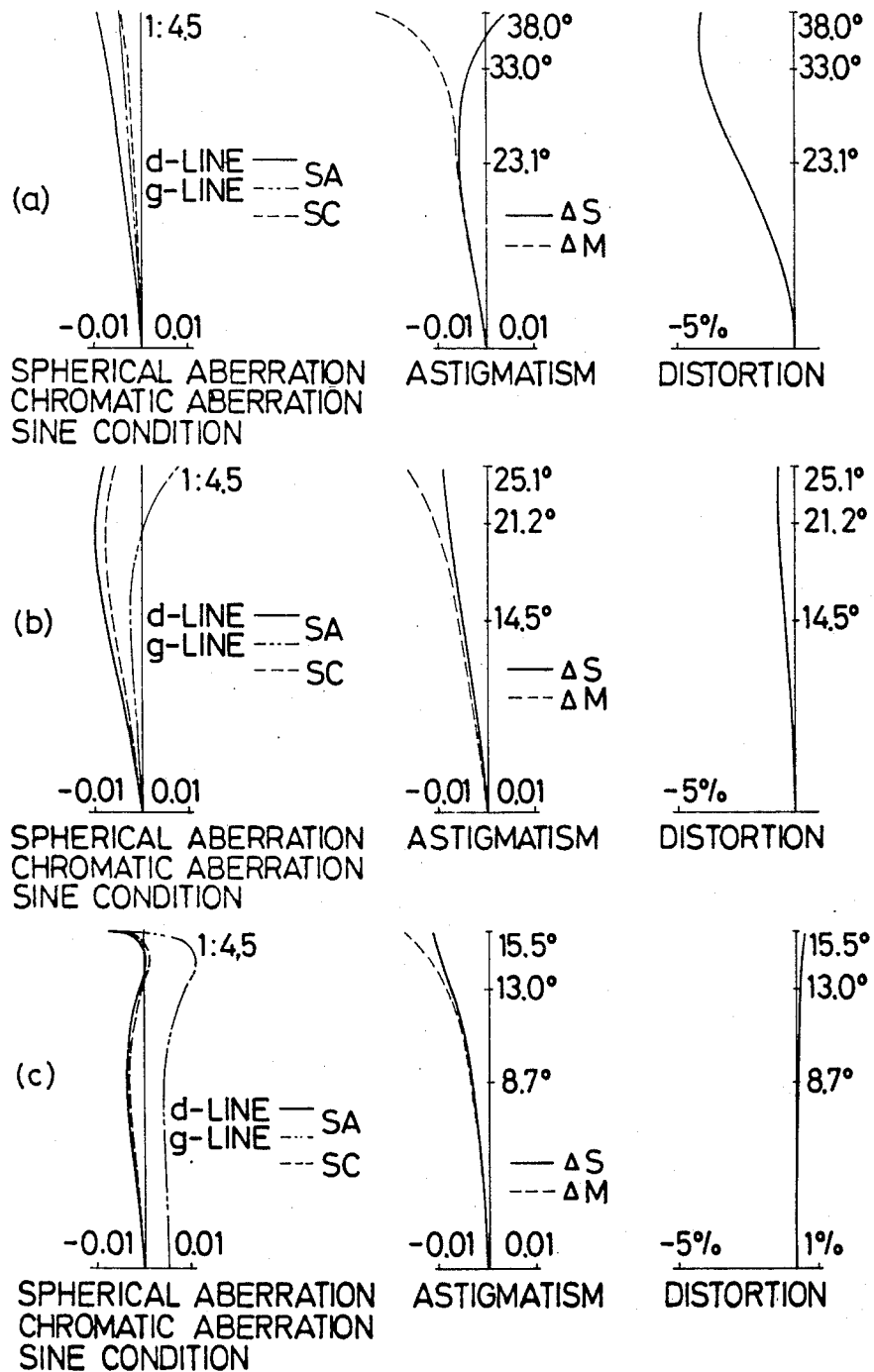
FIGS. 7(a) to 7(c) show the aberration conditions of Example 3.

In the drawings:

$r_i$ is the radius of curvature of the i-th lens surface, $d_i$ is the thickness of the lens or the space between adjacent lens surfaces, A is the variable lens diaphragm, B is the fixed lens diaphragm, $\Delta X_1$ is the amount of movement of the first lens group, $\Delta X_2$ is the amount of movement of the second lens group, and $\Delta X_3$ is the amount of movement of the fixed diaphragm.

The zoom lens system of the present invention is composed of a first divergent lens group and a second convergent lens group. The overall focal length is varied by the relative mechanical movement of the first and second lens group, and at the same time the image focus is maintained constant. More specifically, the first divergent lens group comprises at least two positive lenses and at least two negative lenses, and the arrangement includes positive, negative, and positive lens units or negative, positive, negative, and positive lens units in order from the object side. In either order the last lens on the image side is always positive. The second convergent lens group comprises at least two positive lenses facing the object side, and the lens order from the object side includes positive, negative, and positive lens units. The fixed aperture or diaphragm is positioned behind the second lens group. The zoom lens system must satisfy the following conditions:

$$2.3 \leq Z \leq 3.0, \quad (I)$$

$$0.8 \leq \frac{|f_1|}{\sqrt{f_W f_T}} \leq 1.5, \quad (II)$$

$$0.46 \leq \frac{f_2}{f_T} \leq 0.64, \text{ and} \quad (III)$$

$$1.15 \leq \frac{r_I}{f_W} \leq 2.3, \quad (IV)$$

wherein:

$Z$ is the zoom ration ($Z = f_T/f_W$), $f_1$ is the focal length of the first lens group, $f_2$ is the focal length of the second lens group, $f_W$ is the focal length in the wide angle position, $f_T$ is the focal length in the telescopic or narrow angle position, and $r_I$ is the radius of curvature of the lens surface facing the object of the positive lens nearest to the image in the first lens group.

In the first divergent lens group, the last positive lens faces the image to prevent focal length variations and variations and/or increases in the aberrations accompanying focusing. In the second convergent lens group at least two positive lenses are arranged facing the object to prevent spherical aberrations accompanying the focal length variation. The fixed aperture or diaphragm is positioned behind the second lens group on the image side to prevent flare in the middle and telescopic ranges. Flare can be more effectively prevented by moving the fixed aperture or diaphragm and by opening or closing the variable aperture or diaphragm in response to the focal length variations.

Condition I specifies the range or zoom ratio of the lens system. The minimum value of 2.3 is in accordance with an object of the invention. Above the maximum value of 3.0 in a two lens group type of zoom lens system a variety of aberrations sharply increase at both the wide angle and telescopic ends, and compensation measures unduly increase the overall length of the lens system.

Condition II relates to the overall length of the lens system. As mentioned above, if the focal length of the first lens group is established near the value of $-\sqrt{f_W f_T}$, the maximum overall length of the lens system can be reduced while still maintaining good balance. If the ratio of $$\frac{|f_1|}{\sqrt{f_W f_T}}$$

is less than the minimum limiting value of 0.8, the telescopic end becomes unduly elongated and the aberrations thereat increase. If the ratio exceeds the maximum limiting value of 1.5, though the aberrations are well compensated, the wide end length becomes too long and thus too the overall length of the lens system, which works against the object of miniaturization.

With respect to condition III, as mentioned above the shorter the focal length of the second lens group the shorter the overall length of the lens system. Below the minimum limiting value of 0.46, however, the powers of the lenses become too strong whereby their aberrations are not well compensated. According to condition III, when the zoom lens of the present invention is compared with a conventional two lens group type of zoom lens having a zoom ratio of 2.0 or less, ($f_2/f_T$) of the conventional zoom lens exceeds the maximum limiting value of 0.64. If the conventional zoom lens has a zoom ratio of 1.0 and the fixed retrofocus lens is separated or split into the first and second lens groups, ($f_2/f_T$) becomes still greater. The maximum limiting value of condition III is thus important to maximize the zoom ratio and miniaturize the overall lens system.

With respect to condition IV, above the maximum limiting value of 2.3, although the aberrations are well compensated the lens system becomes unduly large. Conversely, below the minimum limiting value of 1.15, although the lens system is easily miniaturized the spherical aberration accompanying focal length variations increases.

Four Examples of the present invention will be hereinafter described, wherein:

r is the radius of curvature, d is the thickness of the lens or the distance between adjacent lenses, N is the refractive index at the d-line, $\nu$ is the Abbé number, and $\omega$ is the half viewing angle.

EXAMPLE 1

| | Surface No. | r | d | N | $\nu$ |
|---|---|---|---|---|---|
| | | 1 : 3.5–4.5 | f = 1.0–2.36 | $\omega$ = 38.4°–17.6° | |
| | 1 | 5.0189 | 0.1563 | 1.58913 | 61.1 |
| | 2 | −30.5650 | 0.0035 | | |
| first | 3 | 4.7923 | 0.0590 | 1.80610 | 40.9 |
| lens | 4 | 0.8060 | 0.3439 | | |
| group | 5 | −9.3508 | 0.0521 | 1.78650 | 50.2 |
| | 6 | 2.1211 | 0.0778 | | |
| | 7 | 1.4414 | 0.1580 | 1.76180 | 27.1 |
| | 8 | 25.5287 | 1.5274 | | |
| | 9 | 3.3349 | 0.0858 | 1.77250 | 49.6 |
| | 10 | −6.2150 | 0.0035 | | |
| | 11 | 1.1636 | 0.1691 | 1.52630 | 51.1 |
| second | 12 | 7.3634 | 0.0035 | | |
| lens | 13 | 0.6434 | 0.0973 | 1.51823 | 59.0 |
| group | 14 | 1.1888 | 0.0913 | | |
| | 15 | 4.9821 | 0.1744 | 1.84666 | 23.9 |
| | 16 | 0.6116 | 0.1688 | | |
| | 17 | 3.4938 | 0.1320 | 1.54072 | 47.2 |
| | 18 | −1.2504 | | | |
| focal length of the total lens system | | 1.0 | 1.74 | 2.36 | |
| $d_8$ | | 1.5274 | 0.4663 | 0.0936 | |

The variable diaphragm is positioned in front of the ninth lens surface a distance of 0.0448. The fixed diaphragm is positioned behind the eighteenth lens surface a distance of 0.0695 in the wide angle position, and is fixed by standardizing the image surface. The fixed diaphragm has a stop aperture of 0.445.

$$Z = 2.36 \qquad \frac{f_2}{f_T} = 0.604$$

$$\frac{|f_1|}{\sqrt{f_W f_T}} = 1.135 \qquad r_I r_j = 1.4414$$

EXAMPLE 2

| | Surface No. | 1:3.5–4.5 r | f = 1.0–2.70 d | ω = 38.4°–15.5° N | ν |
|---|---|---|---|---|---|
| | 1 | 23.9262 | 0.1021 | 1.61800 | 63.4 |
| | 2 | −9.4751 | 0.0035 | | |
| | 3 | 3.9261 | 0.0417 | 1.83481 | 42.7 |
| first | 4 | 0.8307 | 0.2990 | | |
| lens | 5 | −14.8346 | 0.0486 | 1.69680 | 55.5 |
| group | 6 | 2.4413 | 0.1038 | | |
| | 7 | 1.4396 | 0.1483 | 1.76180 | 27.1 |
| | 8 | 6.4718 | 1.7942 | | |
| | 9 | 2.8732 | 0.0962 | 1.72916 | 54.7 |
| | 10 | −6.2235 | 0.0035 | | |
| | 11 | 1.2366 | 0.1170 | 1.51633 | 64.1 |
| second | 12 | 8.4407 | 0.0035 | | |
| lens | 13 | 0.6543 | 0.1170 | 1.51118 | 51.0 |
| group | 14 | 1.1566 | 0.1014 | | |
| | 15 | 4.0161 | 0.1816 | 1.84666 | 23.9 |
| | 16 | 0.6109 | 0.1500 | | |
| | 17 | 5.9169 | 0.0917 | 1.60342 | 38.0 |
| | 18 | −1.4876 | | | |
| focal length of the total lens system | | 1.0 | 1.81 | 2.70 | |
| $d_8$ | | 1.7942 | 0.6054 | 0.1215 | |

The variable diaphragm is positioned in front of the ninth lens surface a distance of 0.0448. The fixed diaphragm is positioned behind the enghteenth lens surface a distance of 0.0262 in the wide angle position and is movable with the second lens group in a proportional ratio of 0.5. The fixed diaphragm has a stop aperture of 0.302.

$$Z = 2.70 \qquad \frac{f_2}{f_T} = 0.544$$

$$\frac{|f_1|}{\sqrt{f_W f_T}} = 1.101 \qquad r_I = r_j = 1.4396$$

EXAMPLE 3

| | Surface No. | 1:4.5 r | f = 1.0–2.71 d | ω = 38.0°–15.5° N | ν |
|---|---|---|---|---|---|
| | 1 | 2.2537 | 0.0694 | 1.81600 | 46.6 |
| | 2 | 1.1609 | 0.1666 | | |
| | 3 | 2.7666 | 0.2082 | 1.72916 | 54.7 |
| | 4 | −3.8610 | 0.0035 | | |
| first | 5 | −7.2312 | 0.590 | 1.83481 | 42.7 |
| lens | 6 | 0.8623 | 0.2513 | | |
| group | 7 | −3.6135 | 0.0521 | 1.69680 | 55.5 |
| | 8 | 16.1380 | 0.0153 | | |
| | 9 | 1.4680 | 0.1406 | 1.80518 | 25.4 |
| | 10 | 18.7409 | 1.5647 | | |
| | 11 | 1.7249 | 0.1180 | 1.69680 | 55.5 |
| | 12 | −29.2377 | 0.0069 | | |
| | 13 | 1.0075 | 0.1232 | 1.50048 | 65.9 |
| | 14 | 2.7792 | 0.0035 | | |

-continued

| | | | | | |
|---|---|---|---|---|---|
| second | 15 | 0.7513 | 0.1180 | 1.48749 | 70.1 |
| lens | 16 | 1.3197 | 0.1045 | | |
| group | 17 | 6.2101 | 0.1683 | 1.84666 | 23.9 |
| | 18 | 0.6330 | 0.0861 | | |
| | 19 | 2.2208 | 0.1163 | 1.62588 | 35.7 |
| | 20 | −1.6372 | | | |
| focal length of the total lens system | | 1.0 | 1.62 | 2.71 | |
| $d_{10}$ | | 1.5647 | 0.6893 | 0.1193 | |

The variable diaphragm is positioned in front of the eleventh lens surface a distance of 0.0347. The fixed diaphragm is positioned behind the twentieth lens surface a distance of 0.0521 and is movable with the second lens group in the wide zoom end in a proportional ratio of 0.628. The fixed diaphragm has a stop aperture of 0.281.

$$Z = 2.71 \qquad \frac{f_2}{f_T} = 0.523$$

$$\frac{|f_1|}{\sqrt{f_W f_T}} = 0.983 \qquad r_I = r_9 = 1.4680$$

EXAMPLE 4

| | Surface No. | 1:3.5–4.5 r | f = 1.0–2.70 d | ω = 38.1°–15.5° N | ν |
|---|---|---|---|---|---|
| | 1 | 9.5257 | 0.1319 | 1.61800 | 63.4 |
| | 2 | −9.3309 | 0.0035 | | |
| first | 3 | 5.2263 | 0.0416 | 1.83481 | 42.7 |
| lens | 4 | 0.8187 | 0.2979 | | |
| group | 5 | 17.4902 | 0.0486 | 1.84100 | 43.2 |
| | 6 | 1.9875 | 0.0755 | | |
| | 7 | 1.3272 | 0.1492 | 1.80518 | 25.4 |
| | 8 | 5.9227 | 1.7301 | | |
| | 9 | 1.3969 | 0.2376 | 1.80400 | 46.6 |
| | 10 | 108.5188 | 0.0035 | | |
| | 11 | 0.7779 | 0.1249 | 1.67000 | 57.4 |
| second | 12 | 1.8514 | 0.0881 | | |
| lens | 13 | 35.2537 | 0.2528 | 1.84666 | 23.9 |
| group | 14 | 0.6369 | 0.0867 | | |
| | 15 | 1.6809 | 0.1145 | 1.59551 | 39.2 |
| | 16 | −1.6579 | | | |
| focal distance of the total lens system | | 1.0 | 1.77 | 2.70 | |
| $d_8$ | | 1.7301 | 0.6192 | 0.1249 | |

The variable diaphragm is positioned in front of the ninth lens surface a distance of 0.0448. The fixed diaphragm is positioned behind the sixteenth lens surface a distance of 0.0338 and is movable with the second lens group in the wide zoom end in a proportional ratio of 0.5. The fixed lens has a stop aperture of 0.292.

$$Z = 2.70 \qquad \frac{f_2}{f_T} = 0.533$$

$$\frac{|f_1|}{\sqrt{f_W f_T}} = 1.079 \qquad r_I = r_j = 1.3272$$

What is claimed is:

1. In a photographic zoom lens system including relatively movable first divergent and second convergent lens groups on the object and image side, respectively, the improvements characterized by:

(a) the first lens group including at least two positive and two negative lenses, with the image side lens being positive,
(b) the second lens group including at least two positive lens facing the object,
(c) a fixed aperture diaphragm positioned on the image side of the second lens group, and
(d) the overall lens system satisfying the following conditions:

$$Z = 2.36, \quad \text{(I)}$$

$$\frac{|f_1|}{\sqrt{f_W f_T}} = 1.135, \quad \text{(II)}$$

$$\frac{f_2}{f_T} = 0.604, \quad \text{(III)}$$

$$r_I = 1.4414, \quad \text{(IV)}$$

wherein:
Z is the zoom ratio ($Z = f_T/f_W$),
$f_1$ is the focal length of the first lens group,
$f_2$ is the focal length of the second lens group,
$f_W$ is the focal length in the wide angle position,
$f_T$ is the focal length in the telescopic or narrow angle position, and $r_I$ is the radius of curvature of the lens surface facing the object of the positive lens nearest to the image in the first lens group, and (V)

| | 1 : 3.5–4.5  f = 1.0–2.36  ω = 38.4°–17.6° | | | |
|---|---|---|---|---|
| | Surface No. | r | d | N | ν |
| | 1 | 5.0189 | 0.1563 | 1.58913 | 61.1 |
| | 2 | −30.5650 | 0.0035 | | |
| first | 3 | 4.7923 | 0.0590 | 1.80610 | 40.9 |
| lens | 4 | 0.8060 | 0.3439 | | |
| group | 5 | −9.3508 | 0.0521 | 1.78650 | 50.2 |
| | 6 | 2.1211 | 0.0778 | | |
| | 7 | 1.4414 | 0.1580 | 1.76180 | 27.1 |
| | 8 | 25.5287 | 1.5274 | | |
| | 9 | 3.3349 | 0.0858 | 1.77250 | 49.6 |
| | 10 | −6.2150 | 0.0035 | | |
| | 11 | 1.1636 | 0.1691 | 1.52630 | 51.1 |
| second | 12 | 7.3634 | 0.0035 | | |
| lens | 13 | 0.6434 | 0.0973 | 1.51823 | 59.0 |
| group | 14 | 1.1888 | 0.0913 | | |
| | 15 | 4.9821 | 0.1744 | 1.84666 | 23.9 |
| | 16 | 0.6116 | 0.1688 | | |
| | 17 | 3.4938 | 0.1320 | 1.54072 | 47.2 |
| | 18 | −1.2504 | | | | wherein:
$r_i$ is the radius of curvature of the ith lens surface,
$d_i$ is the thickness of the ith lens or the distance between adjacent lenses,
N is the refractive index at the d-line,
ν is the Abbé number, and
ω is the half viewing angle.

2. In a photographic zoom lens system including relatively movable first divergent and second convergent lens groups on the object and image side, respectively, the improvements characterized by:
(a) the first lens group including at least two positive and two negative lenses, with the image side lens being positive,
(b) the second lens group including at least two positive lens facing the object,
(c) a fixed aperture diaphragm positioned on the image side of the second lens group, and
(d) the overall lens system satisfying the following conditions:

$$Z = 2.70 \quad \text{(I)}$$

$$\frac{|f_1|}{\sqrt{f_W f_T}} = 1.101 \quad \text{(II)}$$

$$\frac{f_2}{f_T} = 0.544 \quad \text{(III)}$$

$$r_I = 1.4396 \quad \text{(IV)}$$

wherein:
Z is the zoom ratio ($Z = f_T/f_W$),
$f_1$ is the focal length of the first lens group,
$f_2$ is the focal length of the second lens group,
$f_W$ is the focal length in the wide angle position,
$f_T$ is the focal length in the telescopic or narrow angle position, and
$r_I$ is the radius of curvature of the lens surface facing the object of the positive lens nearest to the image in the first lens group, and (V)

| | 1 : 3.5–4.5  f = 1.0–2.70  ω = 38.4°–15.5° | | | |
|---|---|---|---|---|
| | Surface No. | r | d | N | ν |
| | 1 | 23.9262 | 0.1021 | 1.61800 | 63.4 |
| | 2 | −9.4751 | 0.0035 | | |
| | 3 | 3.9261 | 0.0417 | 1.83481 | 42.7 |
| first | 4 | 0.8307 | 0.2990 | | |
| lens | 5 | −14.8346 | 0.0486 | 1.69680 | 55.5 |
| group | 6 | 2.4413 | 0.1038 | | |
| | 7 | 1.4396 | 0.1483 | 1.76180 | 27.1 |
| | 8 | 6.4718 | 1.7942 | | |
| | 9 | 2.8732 | 0.0962 | 1.72916 | 54.7 |
| | 10 | −6.2235 | 0.0035 | | |
| | 11 | 1.2366 | 0.1170 | 1.51633 | 64.1 |
| second | 12 | 8.4407 | 0.0035 | | |
| lens | 13 | 0.6543 | 0.1170 | 1.51118 | 51.0 |
| group | 14 | 1.1566 | 1.1014 | | |
| | 15 | 4.0161 | 0.1816 | 1.84666 | 23.9 |
| | 16 | 0.6109 | 0.1500 | | |
| | 17 | 5.9169 | 0.0917 | 1.60342 | 38.0 |
| | 18 | −1.4876 | | | | wherein:
$r_i$ is the radius of curvature of the ith lens surface,
$d_i$ is the thickness of the ith lens or the distance between adjacent lenses,
N is the refractive index at the d-line,
ν is the Abbé number, and
ω is the half viewing angle.

3. In a photographic zoom lens system including relatively movable first divergent and second convergent lens groups on the object and image side, respectively, the improvements characterized by:
(a) the first lens group including at least two positive and two negative lenses, with the image side lens being positive,
(b) the second lens group including at least two positive lens facing the object,
(c) a fixed aperture diaphragm positioned on the image side of the second lens group, and
(d) the overall lens system satisfying the following conditions:

$$Z = 2.71, \quad \text{(I)}$$

$$\frac{|f_1|}{\sqrt{f_W f_T}} = 0.983, \quad \text{(II)}$$

$$\frac{f_2}{f_T} = 0.523, \quad \text{(III)}$$

$$r_I = 1.4680, \quad \text{(IV)}$$

wherein:

Z is the zoom ratio ($Z = f_T/f_W$),
$f_1$ is the focal length of the first lens group,
$f_2$ is the focal length of the second lens group,
$f_W$ is the focal length in the wide angle position,
$f_T$ is the focal length in the telescopic or narrow angle position, and
$r_I$ is the radius of curvature of the lens surface facing the object of the positive lens nearest to the image in the first lens group, and (V)

| | 1:4.5 | f = 1.0-2.71 | ω = 38.0°-15.5° | | |
|---|---|---|---|---|---|
| | Surface No. | r | d | N | ν |
| | 1 | 2.2537 | 0.0694 | 1.81600 | 46.6 |
| | 2 | 1.1609 | 0.1666 | | |
| | 3 | 2.7666 | 0.2082 | 1.72916 | 54.7 |
| | 4 | −3.8610 | 0.0035 | | |
| first | 5 | −7.2312 | 0.0590 | 1.83481 | 42.7 |
| lens | 6 | 0.8623 | 0.2513 | | |
| group | 7 | −3.6135 | 0.0521 | 1.69680 | 55.5 |
| | 8 | 16.1380 | 0.0153 | | |
| | 9 | 1.4680 | 0.1406 | 1.80518 | 25.4 |
| | 10 | 18.7409 | 1.5647 | | |
| | 11 | 1.7249 | 0.1180 | 1.69680 | 55.5 |
| | 12 | −29.2377 | 0.0069 | | |
| | 13 | 1.0075 | 0.1232 | 1.50048 | 65.9 |
| second | 14 | 2.7792 | 0.0035 | | |
| lens | 15 | 0.7513 | 0.1180 | 1.48749 | 70.1 |
| group | 16 | 1.3197 | 0.1045 | | |
| | 17 | 6.2101 | 0.1683 | 1.84666 | 23.9 |
| | 18 | 0.6330 | 0.0861 | | |
| | 19 | 2.2208 | 0.1163 | 1.62538 | 35.7 |
| | 20 | −1.6372 | | | | wherein:

$r_i$ is the radius of curvature of the ith lens surface,
$d_i$ is the thickness of the ith lens or the distance between adjacent lenses,
N is the refractive index at the d-line,
ν is the Abbé number, and
ω is the half viewing angle.

4. In a photographic zoom lens system including relatively movable first divergent and second convergent lens groups on the object and image side, respectively, the improvements characterized by:
  (a) the first lens group including at least two positive and two negative lenses, with the image side lens being positive,
  (b) the second lens group including at least two positive lens facing the object,
  (c) a fixed aperture diaphragm positioned on the image side of the second lens group, and
  (d) the overall lens system satisfying the following conditions:

$$Z = 2.70, \quad (I)$$

$$\frac{|f_1|}{\sqrt{f_W f_T}} = 1.079, \quad (II)$$

$$\frac{f_2}{f_T} = 0.533, \quad (III)$$

$$r_I = 1.3272, \quad (IV)$$

wherein:

Z is the zoom ratio ($Z = f_T/f_W$),
$f_1$ is the focal length of the first lens group,
$f_2$ is the focal length of the second lens group,
$f_W$ is the focal length in the wide angle position,
$f_T$ is the focal length in the telescopic or narrow angle position, and
$r_I$ is the radius of curvature of the lens surface facing the object of the positive lens nearest to the image in the first lens group, and (V)

| | 1:3.5-4.5 | f = 1.0-2.70 | ω = 38.1°-15.5° | | |
|---|---|---|---|---|---|
| | Surface No. | r | d | N | ν |
| | 1 | 9.5257 | 0.1319 | 1.61800 | 63.4 |
| | 2 | −9.3309 | 0.0035 | | |
| first | 3 | 5.2263 | 0.0416 | 1.83481 | 42.7 |
| lens | 4 | 0.8187 | 0.2979 | | |
| group | 5 | 17.4902 | 0.0486 | 1.84100 | 43.2 |
| | 6 | 1.9875 | 0.0755 | | |
| | 7 | 1.3272 | 0.1492 | 1.80518 | 25.4 |
| | 8 | 5.9227 | 1.7301 | | |
| | 9 | 1.3969 | 0.2376 | 1.80400 | 46.6 |
| | 10 | 108.5188 | 0.0035 | | |
| | 11 | 0.7779 | 0.1249 | 1.67000 | 57.4 |
| second | 12 | 1.8514 | 0.0881 | | |
| lens | 13 | 35.2537 | 0.2528 | 1.84666 | 23.9 |
| group | 14 | 0.6369 | 0.0867 | | |
| | 15 | 1.6809 | 0.1145 | 1.59551 | 39.2 |
| | 16 | −1.6579 | | | | wherein:

$r_i$ is the radius of curvature of the ith lens surface,
$d_i$ is the thickness of the ith lens or the distance between adjacent lenses,
N is the refractive index at the d-line,
ν is the Abbé number, and
ω is the half viewing angle.

* * * * *